United States Patent
Döbler et al.

(10) Patent No.: US 9,894,435 B2
(45) Date of Patent: Feb. 13, 2018

(54) METHOD AND ARRANGEMENT FOR DETECTING ACOUSTIC AND OPTICAL INFORMATION AS WELL AS A CORRESPONDING COMPUTER PROGRAM AND A CORRESPONDING COMPUTER-READABLE STORAGE MEDIUM

(71) Applicant: Gesellschaft zur Förderung angewandter Informatik e.V., Berlin (DE)

(72) Inventors: Dirk Döbler, Friedersdorf (DE); Gunnar Heilmann, Berlin (DE); Andy Meyer, Berlin (DE)

(73) Assignee: Gesellschaft Zur Forderung Angewandter Informatik E.V., Berlin (DE)

(*) Notice: Subject to any disclaimer, the term of this patent is extended or adjusted under 35 U.S.C. 154(b) by 240 days.

(21) Appl. No.: 14/843,691

(22) Filed: Sep. 2, 2015

(65) Prior Publication Data

US 2016/0066086 A1    Mar. 3, 2016

(30) Foreign Application Priority Data

Sep. 3, 2014  (DE) .................. 10 2014 217 598

(51) Int. Cl.
*H04R 3/00* (2006.01)
*G01H 9/00* (2006.01)
(Continued)

(52) U.S. Cl.
CPC .............. *H04R 3/00* (2013.01); *G01B 11/00* (2013.01); *G01B 17/00* (2013.01); *G01H 9/002* (2013.01);
(Continued)

(58) Field of Classification Search
CPC .............. H04R 1/406; H04R 2201/401; H04R 19/016; H04R 2203/12; H04R 2430/25;
(Continued)

(56) References Cited

U.S. PATENT DOCUMENTS

| | | | |
|---|---|---|---|
| 2002/0181721 A1 | 12/2002 | Sugiyama et al. | |
| 2012/0155703 A1* | 6/2012 | Hernandez-Abrego | H04R 3/005 382/103 |

FOREIGN PATENT DOCUMENTS

DE    10 2008 026 657 A1    9/2009

OTHER PUBLICATIONS

Corresponding German application 10 2014 217 598.4 Office action, dated May 18, 2015, 7 pages.

* cited by examiner

*Primary Examiner* — George Monikang
(74) *Attorney, Agent, or Firm* — Lewis Roca Rothgerber Christie LLP

(57) ABSTRACT

The invention relates to a method and an arrangement for detecting acoustic and optical information as well as a corresponding computer program and a corresponding computer-readable storage medium, which can in particular be used to generate three-dimensional sound maps. The sound maps can be visualized and provided with information about acoustic sources, sound power and emitter characteristics.

For this purpose, it is proposed to use for the detection of acoustic and optical information at least one microphone array and at least one device for detecting optical geometry data, wherein the at least one microphone array and the at least one device for detecting optical geometry data are arranged in a defined positional relationship. Acoustic information emitted from an object and the geometry of the object are detected by moving the at least one microphone (Continued)

array, the at least one device for detecting optical geometry data and the object relative to each other.

8 Claims, 2 Drawing Sheets

(51) Int. Cl.
*G01B 11/00* (2006.01)
*G01B 17/00* (2006.01)
*H04N 13/00* (2006.01)
*H04N 13/02* (2006.01)
*H04R 5/027* (2006.01)

(52) U.S. Cl.
CPC ..... *H04N 13/0011* (2013.01); *H04N 13/0221* (2013.01); *H04N 13/0296* (2013.01); *H04R 5/027* (2013.01); *H04R 2203/12* (2013.01)

(58) Field of Classification Search
CPC ......... H04R 29/005; G10L 2021/02166; A63F 13/213; A63F 13/215; A63F 2300/1087
USPC .................................................. 381/92, 122
See application file for complete search history.

METHOD AND ARRANGEMENT FOR DETECTING ACOUSTIC AND OPTICAL INFORMATION AS WELL AS A CORRESPONDING COMPUTER PROGRAM AND A CORRESPONDING COMPUTER-READABLE STORAGE MEDIUM

CROSS-REFERENCE TO RELATED APPLICATION(S)

This application claims priority to German Patent Application Number 10 2014 217 598.4, filed on Sep. 3, 2014, the entire content of which is incorporated herein by reference.

The invention relates to a method and an arrangement for detecting acoustic and optical information as well as a corresponding computer program and a corresponding computer-readable storage medium, which can be used in particular for generating three-dimensional sound maps. The sound maps can be visualized and provided with information about acoustic sources, sound power and emitter characteristics.

STATE OF THE ART

Beamforming with microphone arrays for acoustic source localization has internationally evolved over the past 10 years and is now state of the art. A number of microphones are hereby fixedly connected to one or more video cameras and the sound field and the video are digitally recorded in parallel. The sound field is decomposed into its individual sources from the data of the microphones by using various computer-aided signal processing techniques and the extracted acoustic map is overlaid with the video image. The acoustic sources are in this way assigned to the corresponding objects. Even three-dimensional beamforming is now an established technique. Here, a 3D-model of the sound emitting object is used for calculating and representing the acoustic sources.

Spatial undersampling creates side lobes (incidental or apparent sources) that limit the dynamics of the acoustic map and complicate the interpretation of acoustic images. Spatial sub-sampling of the sound field is caused limitations in the number of microphones for cost and handling reasons and the resulting reception pattern of the microphone array. The acoustic map is then always a convolution of the reception pattern of the array with the actual sound field (FIG. 1 and FIG. 2). In theory, a very large number of microphones in many different spatial positions would be required to ensure a complete scan. Since this is not possible, several types of advanced signal processing techniques (CLEAN-SC, HDR, DAMAS, orthogonal beamforming) exist, which can improve the results. However, information not contained in the data can also not be reconstructed with sophisticated algorithms.

The spatial undersampling also does not allow drawing conclusions about the emitter characteristics (monopole, dipole, quadrupole) of the detected acoustic sources, since the microphone array measures the acoustic source from only one position. These conclusions are, however, important for evaluating the acoustic sources.

The conventional methods do not allow drawing conclusions about the radiated sound power of the detected acoustic sources. For this purpose, too, the radiated sound field around the sources would have to be thoroughly explored.

The exact distance from each microphone to each point on the surface of the object must also be determined for a correct calculation of the sound map. For flat surfaces, the distance of the microphone array to the object surface is usually determined directly, wherein the surface and the array axis must be perpendicular to each other. A 3D-model must be available for very deeply structured objects or indoor measurements, requiring extra effort. Furthermore, fitting must additionally be performed, i.e., the relative position of the microphone array to the 3D-model must be determined.

It is therefore the object of the invention to provide a method and an arrangement for detecting acoustic and optical information as well as a corresponding computer program and a corresponding computer-readable storage medium, which obviate the disadvantages of the known solutions and, more particularly, make it possible to increase the number of spatial sampling points without increasing the number of physically present microphones.

This object is attained with the invention by the features in claims 1 and 8 to 10. Advantageous embodiments of the invention are recited in the dependent claims.

A particular advantage of the invention is, inter alia, that the problem associated with spatial sub-sampling the sound field of objects is greatly reduced and that hence incidental or apparent sources are eliminated. This is achieved by using in the inventive method at least one microphone array and at least one device for measuring optical geometry data. The at least one microphone array and the at least one device for measuring optical geometry data are hereby arranged in a defined relative positional relationship to each other. Preferably, the microphone array(s) and the device(s) for detecting optical geometry data are fixedly interconnected at least during the detection of acoustic and optical information. It is particularly advantageous when the microphone array(s) and the device(s) for measuring optical geometry data are detachably interconnected.

A microphone array includes at least two microphones, preferably however a plurality of microphones, such as for example between 48 and 120 microphones. The number of microphones depends on the field of application, the geometry of the object and/or the nature of the acoustic source and may even exceed the number of 120.

According to a preferred embodiment, a 3D-scanner, for example a laser scanner, may be used as a device for detecting optical geometry data. Advantageously, an optical line scanner may be employed or a 3D-camera system that operates according to the time of flight method (TOF). Preferably, a 3D-model is generated from the captured 3D-information with a data processing device.

According to a preferred embodiment, at least one optical camera may be employed in addition to the at least one microphone array and the at least one device for detecting geometric data. The generated 3D-model can then advantageously be combined with the optical (color) information, in particularly superimposed.

According to the invention, the acoustic information or signals emitted from the object are detected by the at least one microphone array, and the geometry, i.e. the shape of the surface of the object, is detected by the at least one device for detecting optical geometry data. To this end, the microphone array(s) and the device(s) for detecting optical geometry data, on the one hand, and the object, on the other hand, are moved relative to each other. The (relative) movement can be performed manually. In an alternative embodiment, the (relative) movement may be performed by a machine, preferably under automatic control.

Preferably, the relative positional relationship between the at least one microphone array and the at least one device for detecting optical geometry data remains unchanged during the (relative) movement.

Preferably, the acoustic information and the geometry of the object are acquired simultaneously. According to a preferred embodiment, the microphone array(s) and the device(s) for detecting optical geometry data are moved to a predetermined number of discrete positions, wherein the acoustic and optical information is acquired at these positions. In an alternative embodiment, the acoustic and optical information may be acquired continuously during the (relative) movement.

Depending on the objects to be detected and/or the acoustic information, the acoustic and optical information may advantageously be detected in at least one portion of the various positions that each have a different relative positional relationship.

According to another preferred embodiment, the spatial location (absolute spatial coordinates x, y, z or relative spatial coordinates x', y', z' with respect to the object) and the orientation (angle information, for example, the Euler angle) of the at least one microphone array and the at least one device for detecting optical geometry data are measured for at least a portion of the detection positions, preferably for all detection positions. Advantageously, the at least one microphone array and the at least one device for detecting optical geometry data may be combined as a system, with the system then being permanently linked to a coordinate system. To determine the absolute or relative position and angle coordinates, the position and orientation of the coordinate system associated with the system is compared with a world coordinate system (absolute coordinates) or with a coordinate system that is associated with the object (relative coordinates). In particular, the relative positional relationship of the at least one microphone array and the at least one device for detecting optical geometric data are detected with respect to the object and recorded. In particular, the distance of the at least one microphone array and the at least one device for detecting optical geometry data from the object and the direction of the at least one microphone array and of the at least one device for detecting optical geometry data are detected with respect to the object and recorded, preferably as a trajectory.

In accordance with a preferred embodiment, a 3D-model of the object is created from the detected geometric data by using computer-aided calculation methods (stitching). Preferably, the 3D-model is generated during the acquisition of the geometric information. In particular, the 3D-model may be calculated from already captured (individual) depth images. Joining of the different 3D-depth images into a complete object is greatly facilitated by integrating a 3D-position detection and acceleration sensor (for example, a gyroscope) in the measuring system, which also captures the position and the movement (trajectory) of the device for detecting optical geometry data (e.g. of an [optical] camera).

A (sum) sound map is calculated from the recorded acoustic information, wherein the term "sum" is merely meant to indicate that the (sum) sound map was created from several individual sound maps, without intending a restriction to adding or summing of sound maps. Preferably, the (sum) sound map is produced as a three-dimensional sound map. According to a preferred embodiment, individual sound maps that were calculated for various positions with the aid of beam forming algorithms, are combined, preferably weighted, summed and averaged. Preferably, radiation characteristics of individual acoustic sources in different directions are determined. According to another preferred embodiment, the total sound power and/or the sound power of partial acoustic sources of the object are determined. Advantageously, the envelope of the sound field may here be sampled. According to another preferred embodiment, the combination of the individual sound map includes the elimination of apparent acoustic sources and/or reflections, preferably by averaging.

According to a preferred embodiment, at least a portion of the sound maps, preferably all sound maps, may be superimposed on the 3D-model internally in a computer and/or projected onto the 3D-model. In particular, the (sum) sound map combined from individual sound maps is superimposed on the 3D-model or projected onto the 3D-model. This ensures that individual acoustic sources, preferably including their sound characteristics and/or acoustic power, can be better associated with the object. According to a preferred embodiment, at least portions of the 3D-model may be visualized with an superimposed or projected (sum) sound map. It has proven advantageous when the sound characteristics are indicated in more detail by an optical marking, e.g. an arrow.

An arrangement according to the invention has at least one chip and/or processor, at least one microphone array and at least one device for detecting optical geometry data, wherein the at least one microphone array and the at least one device for detecting optical geometry data are arranged in a defined positional relationship, and the arrangement is configured to execute a method for detecting of acoustic and optical information, wherein acoustic information emitted from an object and the geometry of the object are detected by moving the at least one microphone array, the at least one device for detecting optical geometry data and the object relative to one another.

According to a preferred embodiment, the arrangement includes a 3D-position detection and acceleration sensor (preferably a gyroscope). Preferably, the 3D-position detection and acceleration sensor is integrated in the device for detecting optical geometry data. Thus, the trajectory of the arrangement, in particular of the device for detecting optical geometry data, can also detected and preferably recorded during the detection of the acoustic and optical information for at least some, preferably for all positions of the arrangement or of the device for detecting optical geometry data. In a preferred embodiment, at least the 3D-position data (especially spatial and angular coordinates) acquired by the 3D-position detection and acceleration sensor may be used to calculate the 3D-model of the object from the depth images.

An inventive computer program enables a data processing device, after the computer program has been loaded into the memory of the data processing device, in cooperation with at least one microphone array and at least one device for detecting optical geometry data that are arranged in a defined positional relationship to each other, to perform a method for detecting acoustic and optical information, wherein acoustic information emitted from an object and the geometry of the object are detected by moving the at least one microphone array, the at least one device for detecting optical geometry data and the object relative to each other.

According to another preferred embodiment of the invention, the computer program according to the invention is of modular construction, whereby individual modules are installed on different data processing devices.

Advantageous embodiments contemplate additionally computer programs configured to perform additional process steps or process flows specified in the description.

Such computer programs can, for example, be provided for downloading (for a fee or free of charge, freely accessible or password-protected) in a data or communication network. The provided computer programs can then be used by a method wherein a computer program according to claim 10 is downloaded from an electronic data network, for example from the Internet, to a data processing device connected to the data network.

To perform the inventive method, a computer-readable storage medium may be provided on which a program is stored which enables a data processing device, after the program has been loaded into the memory of the data processing device, to perform in cooperation with at least one microphone array and at least one device for detecting optical geometry data, which are arranged in a defined positional relationship to each other, a method for detecting acoustic and optical information, wherein acoustic information emitted from an object and the geometry of the object are detected by moving the at least one microphone array, the at least one device for detecting optical geometry data and the object relative to each other.

The invention provides a number of advantages over the prior art. For example, the sound emitting object is scanned during the acoustic measurement and stored as a 3D-model. Preferably, the object is scanned in three dimensions. Alternatively, however, the 3D-model may also be generated from optical (2D-) information. An additional 3D-scan is then omitted. Since the relative position of the microphone array in relation to the object was recorded, measurements of the distance and fitting of the array relative to the object also become unnecessary.

The (stationary) acoustic field is acquired from many different positions. The actual sources are clearly identified by weighted summation and averaging of a large number of sound maps (approximately 25 sound map/s with Kinect), with side lobes (apparent sources) and reflections averaged out. The quality of the acoustic image corresponds to the result obtained with a much more complex actual increase in the number of microphones.

Due to the recorded motion trajectory, the correct distances of the microphones to the sound emitting object are known at all times. Focus errors are eliminated, and the source power can be accurately determined.

By measuring the acoustic sources from many different directions, conclusions can be drawn about the radiation characteristics of the acoustic sources. These can be plotted in the resulting three-dimensional sound map, for example in form of directional arrows, wherein the length of the arrows indicates the radiated power of the source in the corresponding direction.

Conclusions about the total sound power and also about the sound power on the partial acoustic sources can be drawn by scanning the "envelope" of the sound field.

The invention will be explained below in more detail with reference to an exemplary embodiment illustrated the figures of the drawings, wherein.

Figure 1:
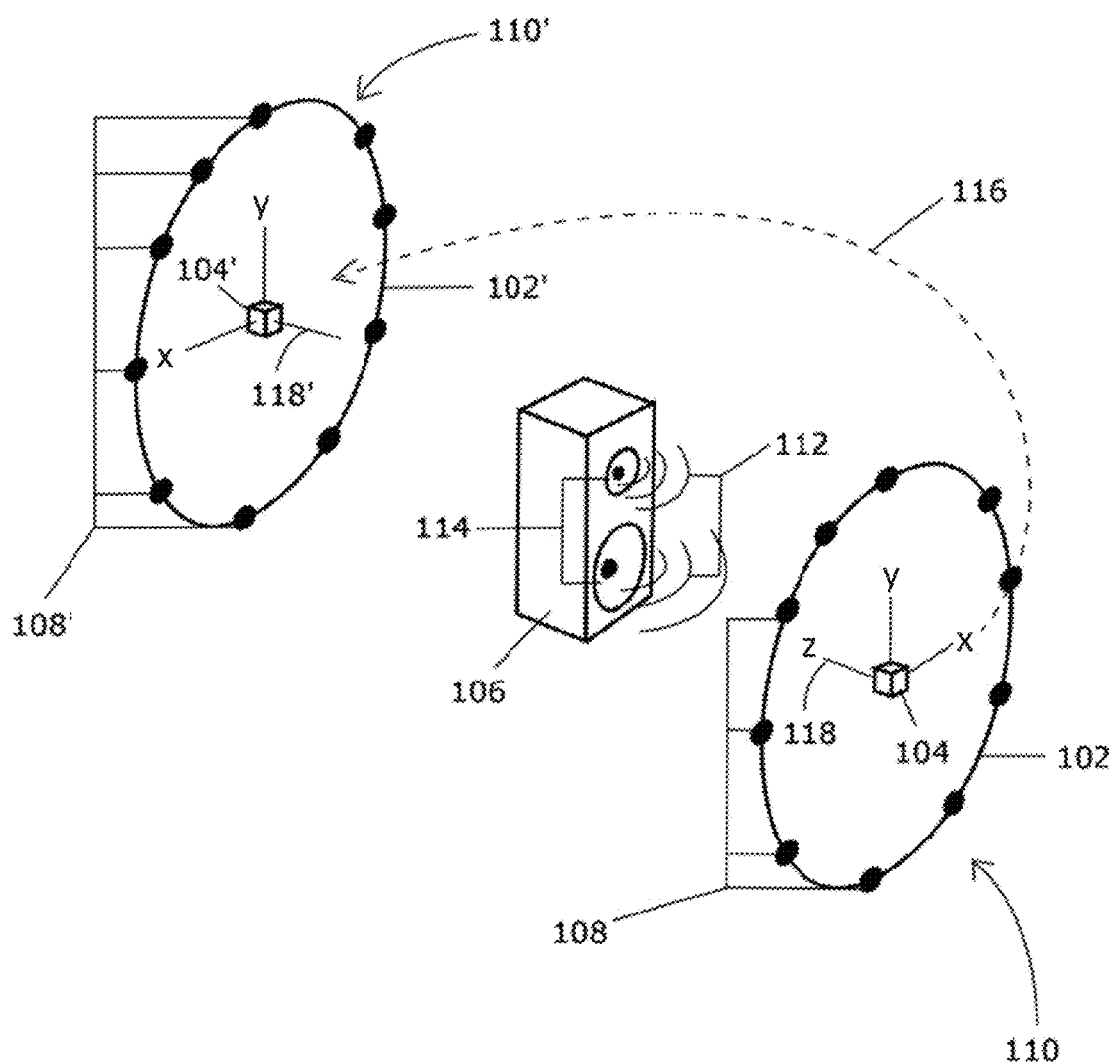
FIG. 1 shows a schematic diagram of the method.
Figure 2:
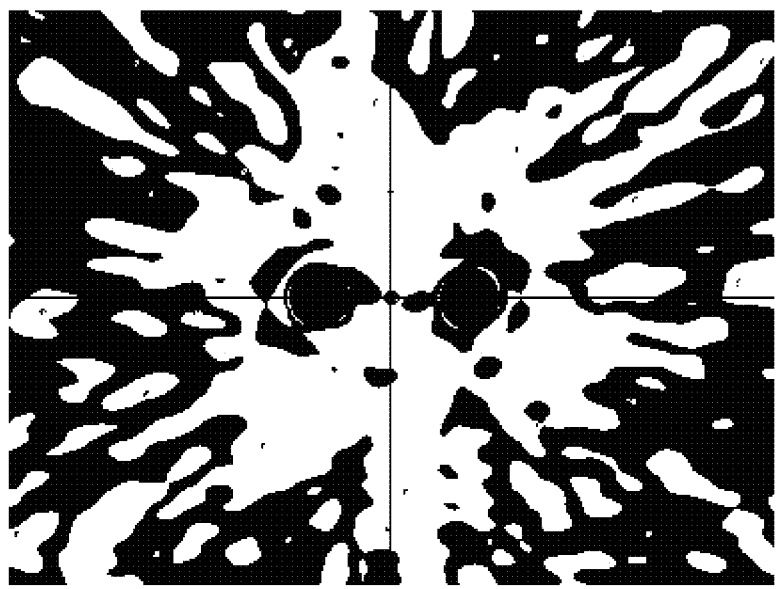
FIG. 2 shows an exemplary visualization of the sound field of two acoustic sources recorded with a 48-channel microphone array.
Figure 3:
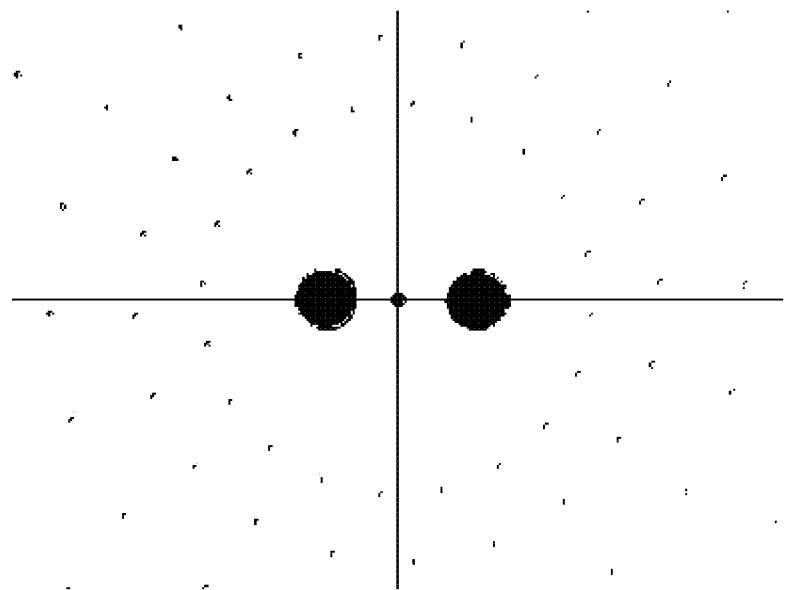
FIG. 3 shows an exemplary visualization of the sound field of two acoustic sources recorded with a 120-channel microphone array.

The invention will now be explained in more detail with reference to an exemplary embodiment. According to the embodiment, an annular microphone array 102, 102', which is arranged in a defined positional relationship to one or more 3D-scanners 104, 104', is moved around an object 106. Linear, cross-shaped, spherical microphone array or arrays with randomly distributed microphones 108, 108' may be used as a microphone array in place of the annular microphone array 102, 102'. Likewise, one or more video cameras can be used in place of the at least one 3D-scanner 104, 104'. When using video cameras, the sound-emitting object is acquired two-dimensionally and the 3D-model of the object is, for example, generated by photogrammetric 3D-reconstruction, as described, for example, in the publication: Rodehorst, Volker: Photogrammetric 3D-reconstruction in the near-field by auto-calibration with projective geometry, Wissenschaftlicher Verlag, Berlin 2004.

Likewise, the exemplary method can also be modified by moving the object with respect to a stationary arranged microphone array 102, 102' instead of moving the microphone array 102, 102' around the object 106. However, both the microphone array 102, 102' and the object 106 can also move during capture of the acoustic and optical information.

The invention proposes a device and a method which enable a significantly increase in the number of spatial sampling points, without actually increasing the number of microphones 108, 108' physically present. For this purpose, microphones 108, 108' are mechanically connected in a defined relative position with one or more 3D-scanners 104, 104' with integrated position sensing. Preferably, the microphones 108, 108' and the at least one 3D-scanner 104, 104' are connected to one another by way of a fixed, but releasable mechanical connection. Furthermore, the positional relationship of the microphones 108, 108' with respect to the at least one 3D-scanner 104, 104' is preferably not changed while the acoustic and optical information is being detected. The device 110, 110' composed of microphones 108, 108' and 3D-scanner(s) 104, 104' is now moved manually or automatically around the object 106 to be measured in order to scan the sound field 112 with the microphones 108, 108' at many different locations and from many different directions. In this situation, the object 106 should not move and the acoustic sources 114 of the object 106 should be stationary at least repetitively. At the same time, the sound emitting object 106 is detected with the integrated 3D-scanners 104, 104' three-dimensionally, wherein the recorded individual depth images are computed into an overall model (stitching) during the scanning process. The position and direction of the 3D-scanner 104, 104' (position detection) and hence the microphone positions in relation to the 3D-object 106 are also recorded during the measurement (motion trajectory 116). For this purpose, the device 110, 110' is preferably associated with a coordinate system 118, 118'. The local microphone coordinates (location and angle) and the local scanner coordinates (location and angle) are known in relation to the coordinate system 118, 118'. The location (position) and orientation (angle) of the coordinate system 118, 118' is also captured in the detection positions, i.e. in the positions where acoustic and/or optical information is captured, and stored.

For example, a camera used for the motion control of computer games (e.g. a Kinect® camera from Microsoft™) can be used as the 3D-scanner 106; this scanner also provides normal camera images (video) during the measurement, allowing the microphone array 102, 102' to be used also for 2D-applications without modifications.

In the subsequent evaluation, the corresponding microphone coordinates are now determined for each position of the 3D-scanner 104, 104'. A sound map is then computed for each position of the microphone array 102, 102' by using the known beam forming algorithms and projected onto the 3D-model of the object 106. Obscured regions (shadowing, which cannot be detected by the 3D-scanner 104, 104' from the respective position) are not computed. The individual sound maps computed from the different array positions are summed in a weighted form and averaged. The radiation characteristics of the acoustic sources 114 into the different directions can then be calculated.

It will be understood that the device 110, 110' can also be used while stationary, in which case the objects 106 to be scanned move. In another embodiment, both the device 110, 110' and the measured objects 106 may be arranged statically. The scene is then captured only from a single position in three dimensions. Depth information is then supplied for each image in addition to a photo or video of the scene.

The invention in its embodiment is not limited to the aforedescribed preferred exemplary embodiments. Instead, a number of variants are conceivable that make use of the inventive arrangement, the inventive method, the inventive computer program and the inventive computer-readable storage medium even in fundamentally different embodiments.

REFERENCE SYMBOLS

102 Microphone Array
102' Microphone Array
104 3D-Scanner
104' 3D-scanner
106 Object
108 Microphone
108' Microphone
110 Device
110' Device
112 Sound field
114 Acoustic sources
116 Motion trajectory
118 Coordinate System
118' Coordinate system

The invention claimed is:

1. A method for detecting acoustic and optical information, wherein at least one microphone array and at least one device for detecting optical geometry data is used, and wherein the at least one microphone array and the at least one device for detecting optical geometry data are arranged in a defined positional relationship, characterized in that acoustic information emitted from an object and the geometry of the object are detected by moving the at least one microphone array, the at least one device for detecting optical geometry data and the object relative to each other, wherein an individual sound map is generated in each case from the acoustic information captured by the at least one microphone array in at least part of the positions and a common sound map is calculated from at least a portion of the individual sound maps, wherein preferably acoustic characteristics and/or sound power levels of acoustic sources are calculated.

2. The method of claim 1, wherein the detection of acoustic and optical information is carried out with an unchanged positional relationship, or wherein the detection of the acoustic and optical information is carried out with different positional relationships.

3. The method of claim 1, wherein the at least one microphone array, the at least one device for detecting optical geometry data and/or the object are moved manually or automatically.

4. The method according to claim 1, wherein location and/or angular coordinates are acquired for at least some positions of the at least one microphone array and of the at least one device for detecting optical geometry data and preferably recorded as a trajectory.

5. The method according to claim 1, wherein a 3D-model is generated from depth images generated from detected optical geometry data, preferably computer-aided and automatically.

6. The method according to claim 4, wherein the position coordinates, the angular coordinates, the individual depth images and/or the individual sound maps are detected at discrete detection positions or continuously.

7. An arrangement for capturing acoustic and optical information, comprising:
at least one data processing device,
at least on microphone array, and
at least one device for detecting optical geometry data,
wherein the arrangement is configured to execute a method according to claim 1.

8. A non-transitory computer-readable storage medium having stored thereon a program which enables a data processing device, after the program has been loaded into memory means of the data processing device, to execute in cooperation with at least one microphone array and at least one device for detecting optical geometry data a method according to claim 1.

* * * * *

UNITED STATES PATENT AND TRADEMARK OFFICE
CERTIFICATE OF CORRECTION

PATENT NO. : 9,894,435 B2  
APPLICATION NO. : 14/843691  
DATED : February 13, 2018  
INVENTOR(S) : Dirk Döbler et al.

Page 1 of 1

It is certified that error appears in the above-identified patent and that said Letters Patent is hereby corrected as shown below:

In the Claims

Column 8, Line 36, Claim 7    delete "on microphone array",  
insert -- one microphone array --

Signed and Sealed this  
Ninth Day of July, 2019

Andrei Iancu  
*Director of the United States Patent and Trademark Office*